United States Patent

Cronin et al.

[11] 4,034,280
[45] July 5, 1977

[54] MULTIPLE HIGH VOLTAGE OUTPUT DC-TO-DC POWER CONVERTER

[75] Inventors: Donald L. Cronin, Anaheim; Bertrand F. Farber, Hermosa Beach; Hartmut K. Gehm; Daniel S. Goldin, both of Los Angeles, all of Calif.

[73] Assignee: TRW Inc., Redondo Beach, Calif.

[22] Filed: June 9, 1975

[21] Appl. No.: 585,429

[52] U.S. Cl. .................................. 363/25; 363/97; 363/124

[51] Int. Cl.² .................................. H02M 3/335

[58] Field of Search ............... 321/2, 18, 45 R, 47, 321/14, 21

[56] References Cited

UNITED STATES PATENTS

| | | |
|---|---|---|
| 3,235,790 | 2/1966 | Collins .............................. 321/2 X |
| 3,305,756 | 2/1967 | Doss et al. ........................... 321/2 |
| 3,657,631 | 4/1972 | Martens et al. ............... 321/45 R X |
| 3,742,330 | 6/1973 | Hodges et al. ........................ 321/4 |
| 3,889,177 | 6/1975 | Fendrich, Jr. ........................ 323/17 |

*Primary Examiner*—William M. Shoop
*Attorney, Agent, or Firm*—John J. Connors; Edwin A. Oser; Stephen J. Koundakjian

[57] ABSTRACT

Disclosed is a multiple output DC-to-DC converter. The DC input power is filtered and passed through a chopper preregulator. The chopper output is then passed through a current source inverter controlled by a squarewave generator. The resultant AC is passed through the primary winding of a transformer, with high voltages induced in a plurality of secondary windings. The high voltage secondary outputs are each solid-state rectified for passage to individual output loads. Multiple feedback loops control the operation of the chopper preregulator, one being responsive to the current through the primary winding and another responsive to the DC voltage level at a selected output.

3 Claims, 2 Drawing Figures

MULTIPLE HIGH VOLTAGE OUTPUT DC-TO-DC POWER CONVERTER

The invention described herein was made in the performance of work under a NASA contract and is subject to the provisions of Section 305 of the National Aeronautics and Space Act of 1958, Public Law 85-568 (72 Stat. 435; 42 U.S.C. 2457).

BACKGROUND OF THE INVENTION

1. Field of Invention

This invention relates to DC-to-DC power supply converters, particularly those used in applications requiring multiple high voltage, low ripple outputs.

2. Description of Prior Art

In essence, a DC-to-DC converter is an apparatus designed to accept DC power at a first voltage and output DC power at a differing voltage. Typically, such devices operate by converting the DC input to AC, transforming the AC to a higher voltage and rectifying the higher level AC to provide the necessary DC output.

The power supply for a traveling wave tube (TWT) amplifier within an earth satellite presents special problems. Such a power supply must accept DC from a relatively low voltage power source (typically a solar array) and provide well-regulated, relatively ripple free high voltage power, in a simultaneous manner to a number of outputs having constantly varying loads.

The typical prior art DC-to-DC power converter for such an application accepts the DC source, chops it with a switching device, such as a transistor, reintegrates the signal with inductive and capacitive devices, converts the integrated DC signal to AC with a transistor inverter, transforms the AC to high voltage, rectifies the resultant to DC voltages and configures them to supply a number of outputs.

In such devices, the integration capacitance is physically located "downstream" from the chopper, between the copper inductor and the inverter. In the absence of such capacitance, the desired integration would be lacking, but the input means to the inverter would, because of the presence of the inductor, constitute a current source. The latter configuration would, therefore, limit the current drawn through the chopper and inverter transistors, even during non-steady-state conditions.

With the integration capacitance located as it is in the prior apparatus, the input means becomes a voltage source, because of the electrical energy stored in the intervening capacitor.

Accordingly, during start-up of such a converter, a large current is drawn through the chopper power switch and the inverter transistors, which can easily cause one or more to fail, unless they are highly over rated. Arcing, which can occur in TWT amplifiers, despite emphatic statements to the contrary by their manufacturers, can likewise cause current surges through all the power supply switching chopper and inverter. Finally, because of unpredictable load variations in the TWT depressed collectors, and other factors, such conventional power supplies cannot satisfy the stringent ripple requirements imposed on TWT amplifiers in certain satellite communication system applications.

SUMMARY OF THE INVENTION

Accordingly, it is an object of the present invention to provide a DC-to-DC power supply for high voltage multiple output applications which can meet stringent ripple requirements, even under conditions of constantly varying output loads, with increased reliability of its power switches under start-up and other conditions of dynamic change in current drawn.

Briefly, the power supply of the present invention includes means to cause integration of its inverter input (for example, from a chopper preregulator) to be provided exclusively by an inductance-capacitance combination wherein substantially all of the capacitance is provided by means connected across the high-voltage DC outputs of the inverter. The inverter accepts the integrated DC input and converts it to AC for passage through the primary winding of a transformer. Secondary voltages are induced in each of a plurality of secondary windings, each of which is followed by rectifying means and the capacitive integrating means. The preregulator (which may consist of a transistor chopper), if included, may be goverened by one or more feedback loops, which may, for example, employ means to sense peak current through the primary winding and means to sense the DC level at a selected output point.

DETAILED DESCRIPTION OF THE PREFERRED EMBODIMENT

Figure 2:
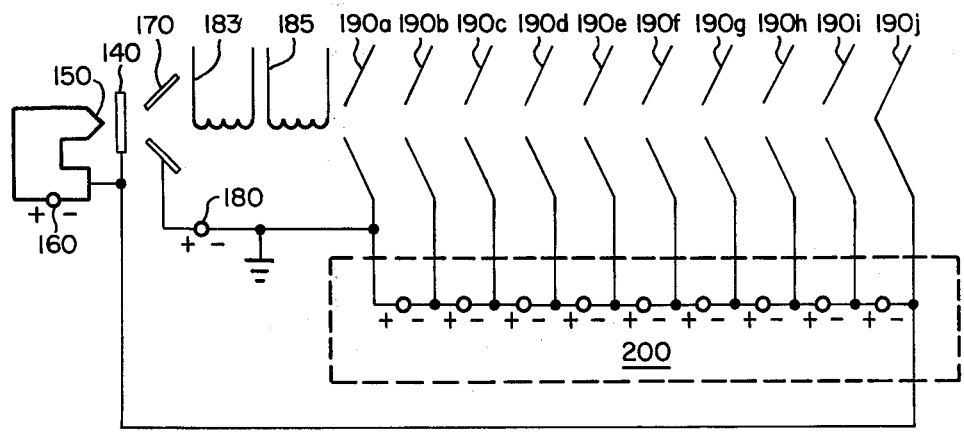
FIG. 2 is a schematic representation of a traveling wave tube (TWT) amplifier.

Referring now to FIG. 2, in a TWT amplifier, a catode 140 is heated by a cathode heater 150, which is energized by a cathode heater supply 160. The heated cathode generates an electron "cloud" which is formed into a beam by an anode 170, energized by an anode supply 180. The beam passes through a primary coil 183 through which an input signal is passed. The input signal modulates the electron beam, which is subsequently passed through a secondary coil 185, causing current with a waveform equivalent to the modulated beam to be induced in the secondary coil. The output from the secondary coil is, in effect, an amplification of the input to the primary coil.

The beam is "collected" by a series of depressed collectors 190a–j. The sucessive collectors are maintained at a successively lower (i.e., more negative) potential, the final collector 190j being at the same potential as the cathode 140.

Because of electron beam fluctuation, the impedance represented by the various collectors constantly varies, hopefully within prescribed limits. Arcing can, however, occur. Accordingly, the current drawn by the various stages of the input 200 to the collectors can vary widely. It is necessary, therefore, to provide a power supply which can maintain low ripple and withstand such surges without failure of its switching components.

Figure 1:
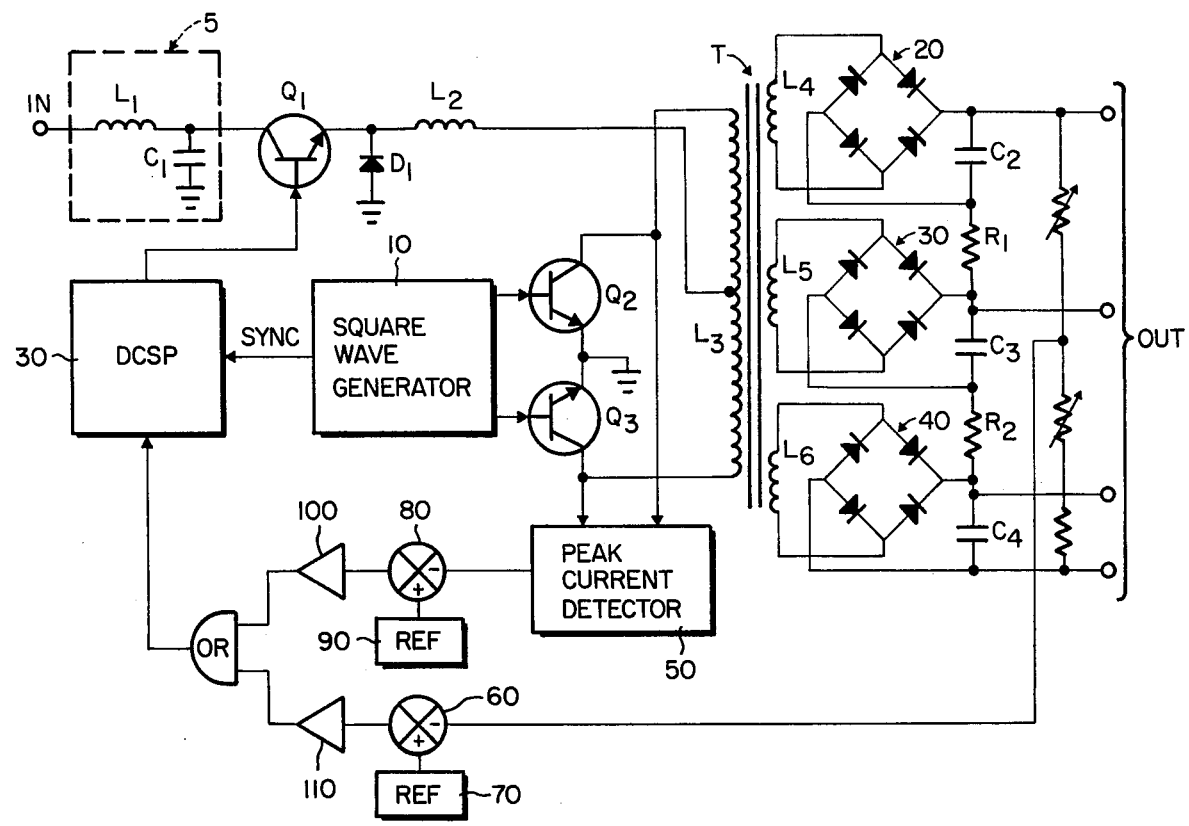
FIG. 1 is a schematic diagram of an apparatus according to the preferred embodiment of the present invention.

FIG. 1 shows the preferred embodiment of the present invention, which comprises a power supply satisfying these requirements. It will be noted that FIG. 1 shows only a three-stage high voltage output. It will be understood, however, than any number of stages can be provided by simply duplicating the components in any one of the stages shown.

The DC input is fist low-pass filtered by means of a passive filter 5, comprising an inductor L1 and capacitor C1. The filtered input is preregulated by being chopped by means of a switching transistor Q1, whose operation is governed by a digital control signal processor (DCSP) 30. In alternative embodiments of the present invention, a plurality of switches may be employed to provide whatever preregulation waveform is needed. In particular, a series pair of switches can be alternately activated to provide an essentially 100% duty cycle.

A series inductor L2 and flyback diode D1 cause the chopper output to be directed unidirectionally to the primary winding L3 of a transformer T. This inductor also acts as a choke to limit the current passed through it — i.e., it causes the input and preregulation means to act together as a current source.

A series inverter consisting of a push-pull pair of transistors Q2, Q3, operated by a squarewave generator 10, causes the current in the primary winding L3 of the transformer T to alternate. This, in turn, causes AC voltages to be induced in the secondary windings L4, L5, L6 of the transformer.

The AC voltage within secondary winding L4 is rectified by a solid state rectifier 20 and passed through the integrating capacitor C2 to generate an output DC voltage whose value depends, in a conventional manner, on the input DC voltage and the ratio of windings between the secondary winding L4 and the primary winding L3 of the transformer T.

Likewise, the AC voltages induced in the other secondary windings L5 and L6 are rectified by solid state rectifiers 30 and 40, respectively, and passed through integrating capacitors C3 and C4, respectively. Each of the output stages (secondary winding, recitifier and integrator) is interconnected with its neighbor through a current limiting resistor R1, R2, respectively, which limits integrator capacitor stresses during discontinuities in output loads as well as controlling maximum energy discharged into individual outputs. In addition, the current limiting resistors prevent excessive voltage buildup in the output power return line during impedence discontinuities.

The operation of the switching transistor Q1 may be controlled by various feedback loops. In the preferred embodiment, two of these are utilized.

The first monitors the current through the primary winding L3 of the transformer T by means of a peak current detector 50, which can simply comprise a series transformer/rectifier. The DC output of the peak current detector is compared with a reference (e.g., from a zener diode) by means of a comparator 80, the output of which is passed through an operational amplifier 100.

In the second loop, the output DC level is monitored at some convenient point and compared with a reference (e.g., from a zener diode) by means of a second comparator 60, the output of which is passed through a second operational amplifier 110.

The outputs from the first operational amplifier 100 and the second operational amplifier 110 are fed to an OR-gate 120, the output of which constitutes an input to the DCSP 30 which governs the operation of the switching transistor Q1. The DCSP is conventional, and may comprise an ordinary analog-to-digital converter. The operation of the DCSP is synchronized by the squarewave generator 10.

In an alternative embodiment, the power switch Q1, and flyback diode D1 are eliminated, the inverter Q2, Q3 being utilized as the switching means. In such an embodiment, the DCSP directly operates the inverter.

Regardless of the particular embodiment, however, the position of the integration capacitance on the secondary winding (i.e., high voltage) side of the transformer T is an essential element of the present invention.

Since the capacitance means is physically absent from the inverter input means, the latter means can act as a current source. Thus, under conditions wherein the current drawn would otherwise increase dynamically, the inductor L2 in conjunction with the peak current detector loop, will serve to limit current buildup in the chopper and inverter power transistor and, therefore, prevent damage to the switching transistors.

However, even though the integration capacitance means is not physically located on the low voltage side of the transformer, and can not, therefore, cause the inverter input means to act as a voltage source (as in the prior art apparatus), its electrical effect will "reflect across" the transformer to provide te desired integration in conjunction with the inductor L2. In addition, physical placement of the integration capacitance means at the high voltage output will serve to reduce output ripple, which is a critical factor in TWT applications.

We claim:
1. A DC to Dc power converter comprising:
   a. a transformer having a primary winding and a plurality of secondary windings;
   b. input circuit means coupled to said primary winding to cause an AC power to flow therethrough;
   c. said input circuit means including means to accept DC power at a first voltage and transistor means to convert said DC power to AC power at a first relatively low voltage for transmission through said primary winding, said transformer being such that the alternating voltage on each of said secondary windings is higher than that at said primary winding;
   d. output circuit means associated with each of said secondary windings to reconvert AC power induced in the associated secondary winding to DC power at a higher voltage;
   e. a capacitor effectively directly connected across each of said secondary windings, the capacitance of each of said capacitors being reflected across said primary winding to provide an input current source; and
   f. a peak current detector having an input coupled across said primary winding and having an output coupled across said input circuit means, thereby to protect said transistor means against over voltage due to a short in any one of said output circuits.
2. A converter as defined in claim 1 wherein said transistor means includes a transistor operated as a chopper.
3. A converter as defined in claim 2 wherein said transistor means is controlled through a feedback circuit connected between said output circuits and said transistor means.

* * * * *